United States Patent
Scanderbeg et al.

(10) Patent No.: US 7,393,185 B2
(45) Date of Patent: *Jul. 1, 2008

(54) FUEL PUMP WITH AUTOMATIC SHUTOFF

(75) Inventors: Berardino C. Scanderbeg, Valencia, CA (US); Alan William Koharcheck, Temple City, CA (US); Peter Edward Czyl, Long Beach, CA (US)

(73) Assignee: Hydro-Aire, Inc., Burbank, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 11/087,934

(22) Filed: Mar. 23, 2005

(65) Prior Publication Data

US 2005/0214127 A1 Sep. 29, 2005

Related U.S. Application Data

(63) Continuation of application No. 10/161,214, filed on May 31, 2002, now Pat. No. 6,908,289.

(51) Int. Cl.
*F04B 49/06* (2006.01)
*F04B 49/08* (2006.01)

(52) U.S. Cl. .......................... 417/12; 417/32; 417/44.2

(58) Field of Classification Search .................. 417/12, 417/18, 32, 44.2
See application file for complete search history.

(56) References Cited

U.S. PATENT DOCUMENTS

| | | | | | |
|---|---|---|---|---|---|
| 2,707,440 | A | * | 5/1955 | Long et al. | 417/12 |
| 2,940,395 | A | * | 6/1960 | Hill | 417/32 |
| 3,559,731 | A | * | 2/1971 | Stafford | 417/12 |
| 4,227,862 | A | | 10/1980 | Andrew et al. | |
| 4,371,315 | A | | 2/1983 | Shikasho | |
| 4,620,835 | A | | 11/1986 | Bell | |
| 4,789,308 | A | * | 12/1988 | Tuckey | 417/44.8 |
| 4,920,942 | A | | 5/1990 | Fujimori et al. | |
| 4,990,057 | A | | 2/1991 | Rollins | |
| 5,020,315 | A | | 6/1991 | Leachman, Jr. et al. | |
| 5,133,181 | A | | 7/1992 | Moore, Jr. | |
| 5,138,559 | A | | 8/1992 | Kuehl et al. | |
| 5,145,322 | A | * | 9/1992 | Senior et al. | 417/32 |
| 5,168,704 | A | | 12/1992 | Kast et al. | |
| 5,201,636 | A | | 4/1993 | Mikulski | |
| 5,464,327 | A | * | 11/1995 | Horwitz | 417/12 |
| 5,525,039 | A | | 6/1996 | Sieghartner | |
| 5,567,134 | A | | 10/1996 | Inoue | |
| 5,572,964 | A | | 11/1996 | Cogneville et al. | |
| 5,722,373 | A | | 3/1998 | Paul et al. | |
| 5,868,550 | A | | 2/1999 | Howchin | |
| 5,888,051 | A | | 3/1999 | McLoughlin et al. | |

(Continued)

*Primary Examiner*—Michael Koczo, Jr.
(74) *Attorney, Agent, or Firm*—Fulwider Patton LLP

(57) ABSTRACT

A pressure sensor subsystem measures the pressure within a fuel pump and outputs an under-pressure signal when the measured pressure is below a predetermined threshold pressure value. A temperature sensor subsystem measures the temperature within the fuel pump and outputs an over-temperature signal when the measured temperature is above a predetermined threshold temperature value. A timing circuit monitors the pressure sensor subsystem and the temperature sensor subsystem for output of the under-pressure and over-temperature signals and outputs a pump disconnect signal when at least one of the signals is output for a prescribed time duration. A power controller disengages power from the pump upon output of a pump disconnect signal by the timing circuit.

6 Claims, 7 Drawing Sheets

U.S. PATENT DOCUMENTS

| | | |
|---|---|---|
| 5,971,712 A | 10/1999 | Kann |
| 6,227,806 B1 | 5/2001 | Libfeld |
| 6,321,527 B1 | 11/2001 | Dyer et al. |
| 6,799,950 B2 * | 10/2004 | Meier et al. .................... 417/12 |
| 6,837,688 B2 * | 1/2005 | Kimberlin et al. ............. 417/32 |

* cited by examiner

FUEL PUMP WITH AUTOMATIC SHUTOFF

RELATED APPLICATIONS

This is a continuation of Ser. No. 10/161,214, filed May 31, 2002 now U.S. Pat. No. 6,908,289.

BACKGROUND OF THE INVENTION

1. Field of the Invention

The invention relates generally to fuel systems and, more particularly, to systems and methods for monitoring operating conditions within an aircraft fuel pump for automated shutdown.

2. Description of the Related Art

An aircraft fuel system must provide for storage of the required amount of fuel and for the delivery of this fuel to the engine(s) at the proper rate and pressure. Nearly all aircraft engines, and particularly complex aircraft using high powered turbine engines, are equipped with a pressure fuel-feed system. In these systems, fuel is drawn from fuel tanks by electrically-driven primary fuel pumps and delivered to the engine at the desired pressure. Alternate fuel pumps serve as backups if a primary fuel pump fails, the alternate fuel pumps providing built-in redundancy in the fuel supply system. The fuel pumps are designed to deliver a continuous supply of fuel at the proper pressure at all times during engine operation. The absence of fuel at the proper pressure within the fuel pump may be indicative of an inadequate fuel supply to the pump. Such a condition is often referred to as a "dry-run" condition. Failure to detect a dry-run condition may cause irreparable pump damage, and could ultimately lead to pump failure and a possible fire danger.

In an attempt to avoid pump damage, complex aircraft which are equipped with fuel pumps are often provided with some type of fuel-pressure warning system. Known pressure warning systems generally include a pressure switch positioned within the fuel pump. When the fuel pressure drops below a safe minimum, the pressure sensor outputs a signal which in turn, illuminates a warning light situated in a conspicuous place in the instrument panel to serve as a warning to the pilot. The engine can continue to run because of built-in redundancy in the fuel supply system, usually provided by backup pumps. However, such, existing fuel systems employing known pressure warning mechanisms require operator input to avoid potentially dangerous pump operating conditions in response to warnings provided by the sensors.

In addition to inadequate fuel pressure within a fuel pump, a high temperature within a fuel pump may also be indicative of a dry-run condition. The presence of adequate fuel tends to keep the internal temperature of the fuel pump at or below a safe operating temperature. When inadequate fuel is present, the operation of the motor within the fuel pump causes the internal temperature to increase. When the fuel pump internal temperature is above the safe operating temperature for a prescribed time interval, a dry run condition may exist. The safe operating temperature and the prescribed time interval are dependent on the type of aircraft and pump. Conventional aircraft fuel pump systems do not take the temperature of the fuel pump into account when mounting pump operations.

Those skilled in the art have recognized a need for fuel systems that eliminate the need for operator intervention when certain operating conditions within the system fall outside of an acceptable range of operation. The need for a system capable of monitoring fuel pump temperature has also been recognized. The invention fulfills these and other needs.

SUMMARY OF THE INVENTION

Briefly, and in general terms, the invention is directed to systems and methods for monitoring operating conditions within a fuel pump assembly for automated shutdown of the pump.

In one currently preferred embodiment, the invention is for a system for monitoring an operating condition within an aircraft fuel pump. The operating conditions monitored include, but are not limited to, electrical voltage and current, and pressure an temperature at locations within the fuel pump assembly. The system includes an operating-condition sensor associated with the fuel pump that is adapted to output an operating-condition fault signal when the operating condition being monitored is not within predetermined values. The system also includes a timing circuit adapted to output a main fault signal when the operating-condition fault signal is output for a prescribed time duration and a power controller adapted to receive the main fault signal and terminate pump operation.

By employing an automated power controller to affect pump operation when fuel-pump operating conditions are at values outside of acceptable limits for a prescribed amount of time, the system provides fuel-pump shut down without operator intervention. Accordingly, the system provides better protection against dry-run pump conditions and the damage often associated therewith.

In a currently preferred aspect of the invention, the operating condition is fuel pressure, the threshold value is a pressure value and the power controller terminates pump operation by disengaging power from the fuel pump when the fuel pressure is at or below the threshold pressure value for the prescribed time duration. In further detailed aspects, the pressure value is approximately 20 PSI and the prescribed time duration is between approximately 20 and 30 seconds. In another detailed aspect, the operating condition is fuel-pump temperature, the threshold value is a temperature value and the power controller affects pump operation by disengaging power from the fuel pump when the fuel-pump temperature is at or above the threshold temperature for the prescribed time duration. In further detailed aspects, the temperature value is approximately 190° F. and the prescribed time duration is between approximately 60 and 180 seconds. The preceding pressure and temperature operating parameters find specific application in fuel systems used in aircraft such as the Boeing 757-767 series. The system, however, is not limited to these operating parameters and maybe readily adapted by one skilled in the art for use in other fuel systems requiring different pressure or temperature parameters.

In another aspect, the invention relates to a system for monitoring at least one of temperature and fuel pressure within an aircraft fuel pump. The system includes a pressure sensor subsystem associated with the fuel pump. The pressure sensor subsystem measures the pressure within the fuel pump and outputs an under-pressure signal when the measured pressure is at or below a threshold pressure value. The system also includes a temperature sensor subsystem also associated with the fuel pump. This subsystem measures the temperature within the fuel pump and outputs an over-temperature signal when the measured temperature is above a threshold temperature value. Further included in the system is a timing circuit that monitors the pressure sensor subsystem and the temperature sensor subsystem for output of the under-pressure and over-temperature signals. The timing circuit outputs a pump disconnect signal when at least one of the signals is output for a prescribed time duration. A power controller disengages power from the pump upon output of a pump disconnect signal by the timing circuit.

In a detailed aspect, the timing circuit includes a first counter that monitors the existence of an under-pressure signal for a first prescribed time duration and a second counter that monitors the existence of an over-temperature signal for a second prescribed time duration. In a further detailed aspect, the prescribed time duration for each of the first and second counters is adjustable by either hardware, e.g., a variable resistor, or by programmable firmware. In another detailed facet of the system the power controller includes a power control device that receives as input both electrical power from an external source and the pump disconnect signal from the timing circuit. The power control device normally feeds the electrical power to the fuel pump. However, upon receipt of a pump disconnect signal it disengages the power from the fuel pump.

In another aspect, the invention relates to a method of controlling the application of electrical power to an aircraft fuel pump in response to an operating condition within the aircraft fuel pump. The method includes measuring the operating condition within the fuel pump; comparing the operating condition to a predetermined range of acceptable values; and disengaging the electrical power from the fuel pump when the operating condition is outside of the predetermined range of values for a prescribed time duration.

In another aspect, the invention relates to a system for controlling the application of electrical power to an aircraft fuel pump in response to an operating condition within the aircraft fuel pump. The system includes means for measuring the operating condition within the fuel pump. The operating condition may include fuel pressure in which case the measuring means may be a full-bridge strain gauge compensated pressure transducer or any other functionally equivalent pressure transducer capable of outputting a voltage corresponding to measured pressure. The operating condition may also include fuel-pump temperature in which case the measuring means may be a resistance temperature detector, a thermistor, a thermocouple or any other functionally equivalent temperature transducer capable of outputting a voltage corresponding to measured temperature. The system also includes means for comparing the operating condition to a predetermined desired range of values; and means for disengaging the electrical power from the fuel pump when the operating condition is different from the desired range of values for a prescribed time duration. The comparing means may be hardware implemented using comparator circuitry or alternatively may be software implemented. The disengaging means includes a power control device such as a relay, a contactor, a solid state relay or any other functionally equivalent device capable of switching from a power engagement state to a power disengagement state.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
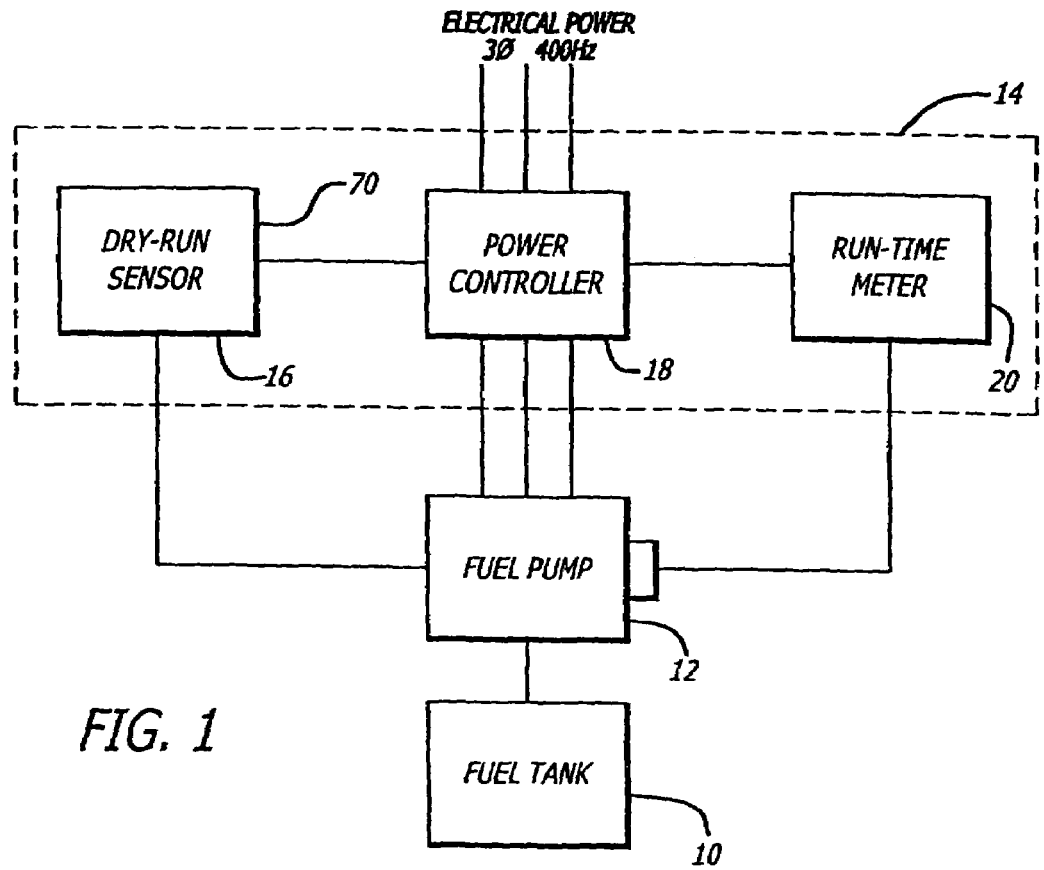
FIG. 1 is a block diagram of a fuel system configured in accordance with the invention, including a fuel tank, fuel pump and a pump disconnect system with a dry-run sensor, a power controller and a run-time meter.

Referring now to the drawings, which are provided for the purposes of illustration, and not by way of limitation, and wherein the reference numerals denote like or corresponding parts throughout the figures, and particularly to FIG. 1, there is shown a fuel system including a fuel tank 10, a fuel pump 12 and a pump disconnect system 14. The pump disconnect system 14 includes an operating-condition sensor 16, referred to herein as a dry-run sensor, a power controller 18 and a recording device 20 such as a run-time meter. The power controller 18 receives 3-phase, 400 Hz electrical power from the aircraft power system and, depending on the operating condition of the fuel pump 12, feeds the power to the fuel pump.

Figure 2:
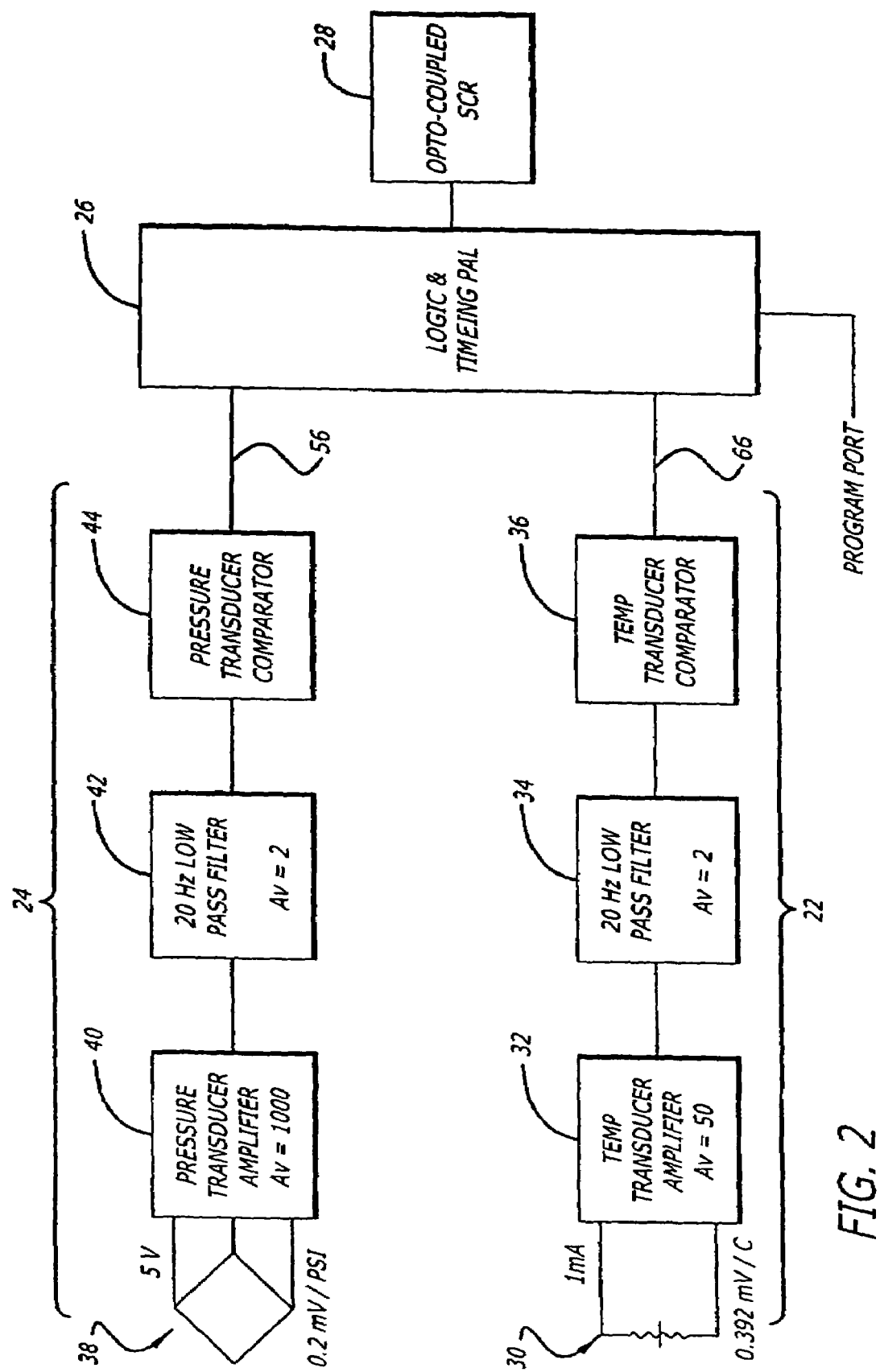
FIG. 2 is a block diagram of the dry-run sensor of FIG. 1 depicting a pressure-sensing subsystem, a temperature-sensing subsystem and a logic and timing portion.

With reference to FIG. 2, the dry-run sensor 16 includes a temperature-sensing subsystem 22, a pressure-sensing subsystem 24, logic and timing programmable array logic (PAL) 26 and a opto-coupled SCR 28.

The opto-coupled SCR provides the interface between the dry-run sensor 16 and the power controller 18 (FIG. 1). The temperature-sensing subsystem 22 of the dry-run sensor 16 includes a temperature transducer 30, which in a preferred embodiment is a resistance temperature detector (RTD) such as model PT 100-8A manufactured by Sensing Devices, Inc. The temperature-sensing subsystem 22 also includes a temperature-transducer amplifier 32, a 20 Hz low-pass filter 34 and a temperature-transducer comparator 36.

The pressure-sensing subsystem 24 of the dry-run sensor 16 includes a pressure transducer 38, which in a preferred embodiment is a full bridge strain gauge compensated pressure transducer such as model 150 SP manufactured by Precision Measurements. The pressure-sensing subsystem 24 also includes a pressure-transducer amplifier 40, a 20 Hz low-pass filter 42 and a pressure-transducer comparator 44.

In one configuration of the pump disconnect system 14, components are selected such that the following specifications and requirements are satisfied. All circuitry and sensors operate over a temperature range of approximately −65° F. to +160° F. Pressure is measured to a minimum accuracy of 5%. Temperature is measured to a minimum accuracy of 3% at the switch point. An under-pressure operating condition exists whenever the pressure transducer output is less than a voltage corresponding to approximately 20 PSI. An over-temperature operating condition exists whenever the temperature transducer outputs a signal corresponding to approximately 190° F. The existence of an under-pressure or an over-temperature operating condition produces a corresponding operating-condition fault signal. Whenever an under-pressure operating-condition fault signal exists for longer than approximately 20 to 30 seconds or an over-temperature operating-condition fault signal exists for longer than approximately 60 to 180 seconds, a main fault signal, i.e., a pump disconnect signal, is generated and power is removed from the fuel pump.

Figure 3:
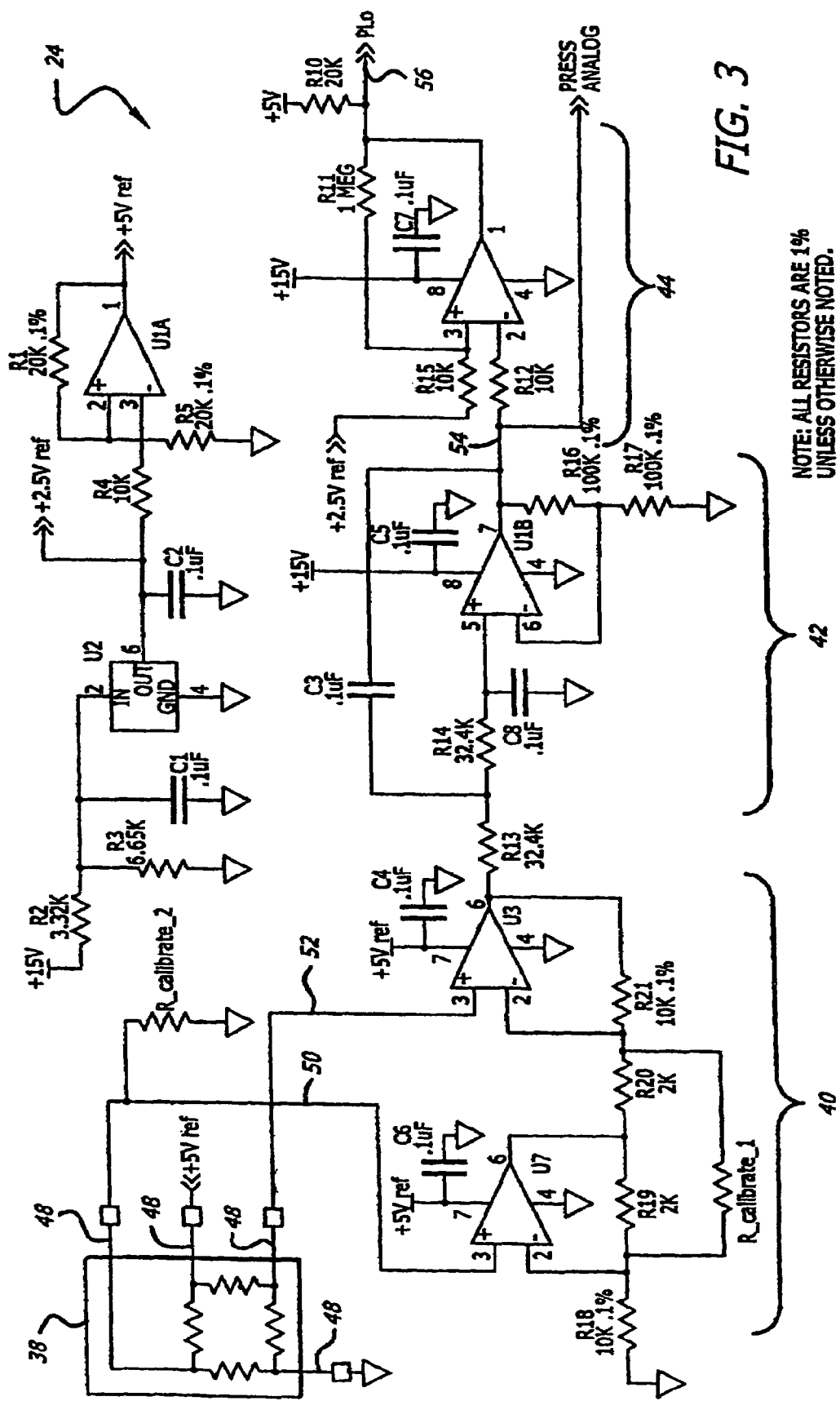
FIG. 3 is a detailed schematic of the pressure-sensing subsystem of the dry-run sensor of FIG. 2.
Figure 8:
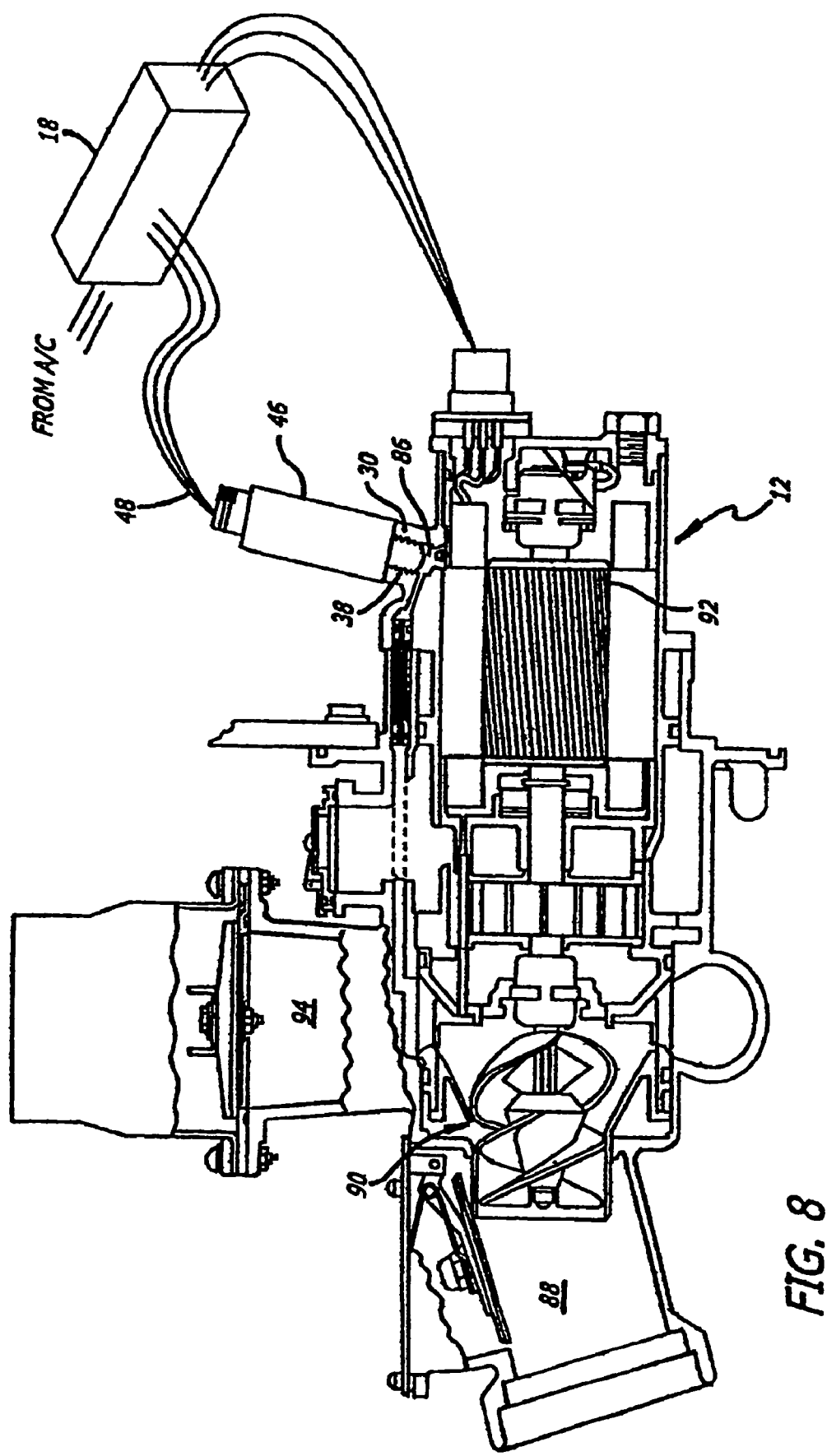
FIG. 8 depicts a cross-section of a fuel pump of FIG. 1 and the interconnection between the pump disconnect system and the fuel pump motor.

With reference to FIGS. 3 and 8, in a preferred embodiment, the pressure transducer 38 is a temperature tracking full strain-gauge bridge mounted on a metal diaphragm (not shown) in an aluminum cylindrical housing 46. The pressure transducer 38 is approximately 0.25 inches in diameter and 0.25 inches in length and is mounted to the fuel pump 12 bulkhead via a penetration hole through the bulkhead with provisions made for a static o-ring seal (not shown). The pressure transducer 38 is held stationary by a retaining ring (not shown). Four electrical wires 48 associated with the pressure transducer 38 exit from the rear of the cylindrical housing 46 and interface with other circuitry of the pressure-sensing subsystem 24 located remote from the fuel pump. In an alternate embodiment, the wire leads 48 coming from the pressure transducer 38 are soldered directly onto a printed circuit board (not shown) within the cylindrical housing 46, along with the other circuitry of the pressure-sensing subsystem 24.

Excitation to the pressure transducer 38 is provided by a 5-volt signal that is created from the 2.5-volt reference level used by the pressure-transducer comparator 44. Level translation is provided by a non-inverting operational amplifier U1A. Full scale output, i.e., 50 PSIG, for the pressure transducer 38 is a 10 mVdc differential with 5 volts of excitation. With an excitation of 5 volts, 0.2 mV/PSI of differential output voltage is available to the input of the pressure-transducer amplifier 40. With short lead lengths, grounded housing, high common-mode ejection and bandwidth limiting, the noise problems often associated with pressure transducers are generally avoided.

The low-level differential-signal outputs 50, 52 of the pressure transducer 38 necessitate a preamplifier design with both low noise and low offset voltage. To accomplish this the pressure sensing subsystem 24 employs two amplifiers U7, U3. These amplifiers U7, U3 have a maximum offset voltage of 40 μV and input referred voltage noise of 85 nV/Vhz. By using tight tolerance resistors and not taking all the gain with the first amplifier U7, common mode rejection on the order of approximately 60 dB may be obtained. Utilizing two amplifiers U7, U3 with a gain-bandwidth product of 6 MHz each, the effective bandwidth of the pressure-transducer amplifier 40 is around 20 kHz. To reduce noise, a two-pole 20 Hz low-pass filter 42 with a gain of 2 Vdc, is inserted between the pressure-transducer amplifier 40 output and a pressure-transducer comparator 44. A side benefit of this arrangement is a reduction in both 60 Hz and 400 Hz power switching spikes.

The analog signal output 54 from the low-pass filter 42 goes to a single rail comparator, U4A that is set to trigger at 2.5 volts. Thus if the output of the low-pass filter 42 is less than 2.5 volts, corresponding to a pressure reading of less than approximately 20 PSI, the comparator 44 outputs an under-pressure fault signal 56.

While the circuitry of the pressure sensing subsystem 24 thus described is configured to output an under-pressure fault signal 56 for pressure readings less than 20 PSI, the circuitry—particularly the comparator 44—may be configured to trigger at voltages corresponding to different threshold pressure readings. This may be done by a resistor value change.

Figure 4:
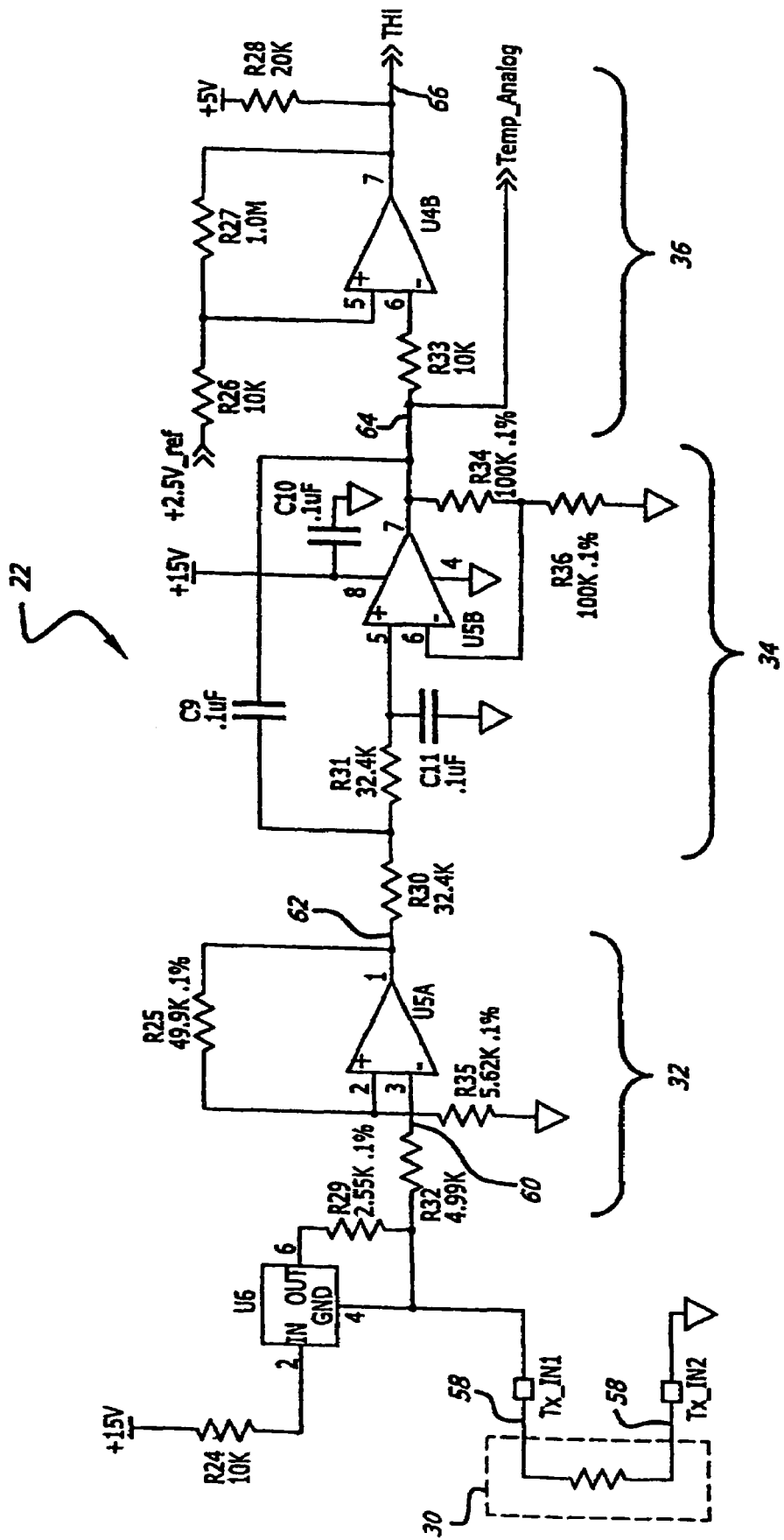
FIG. 4 is a detailed schematic of the temperature-sensing subsystem of the dry-run sensor of FIG. 2.

With reference to FIGS. 4 and 8, in a preferred embodiment the temperature transducer 30 is a platinum-rhodium alloy thermistor with a wire wound element contained in a silica glass coated ceramic body measuring 1.6 mm in diameter with a length of 8.0 mm. The temperature transducer 30 interfaces with the fuel pump 12 bulkhead by a hole drilled into but not penetrating the bulkhead. The temperature transducer 30 is retained in the hole by thermal epoxy. The wire leads 58 coming from the temperature transducer 30 are soldered directly onto a printed circuit board (not shown) within the cylindrical housing 46, preferably using 11 mil wires. The other circuitry associated with the temperature-sensing subsystem 22 is also located on the printed wiring board.

Accuracy of the temperature transducer 30 at the switch point is 0.06%. This is far from being a significant portion of the previously mentioned total error budget of 3% for the temperature measurements. Other contributors to this budget are signal processing error, 1.2%, lead length variation, 0.8%, current source accuracy, 0.6%, thermal resistance variation, 0.3% and sensor self heating, 0.04%. Electrical excitation for the thermistor is a one-milliampere constant current source. This is consistent with the maximum recommended operating level while still producing adequate signal strength.

A floating, three-terminal precision regulator current source U6 with minimal return current outputs the one-milliampere constant current required by the temperature transducer 30 within the required accuracy. The output 60 of the temperature transducer 30 and current source U6 is input to the temperature-transducer amplifier 32 which includes a non-inverting amplifier U5A that produces a gain of 9.79 volts. The output 62 of the temperature-transducer amplifier 32 is input to the 20 Hz low-pass filter 34. The output 64 of the low-pass filter 34 is input to the temperature transducer comparator 36. Both the filter 34 and comparator 36 are similar to that previously described with respect to the pressure-sensing subsystem 24 (FIG. 2). Thus if the output of the low pass filter 34 is greater than 2.5 volts, corresponding to a temperature reading greater than approximately 190° F., the comparator 36 outputs an over-temperature fault signal 66.

While the circuitry of the temperature sensing subsystem 22 thus described is configured to output an over-temperature fault signal 66 for temperature readings over 190° F., the circuitry—particularly the comparator 36—may be configured to trigger at voltages corresponding to different threshold temperatures. This may be done by a resistor value change.

Figure 5:
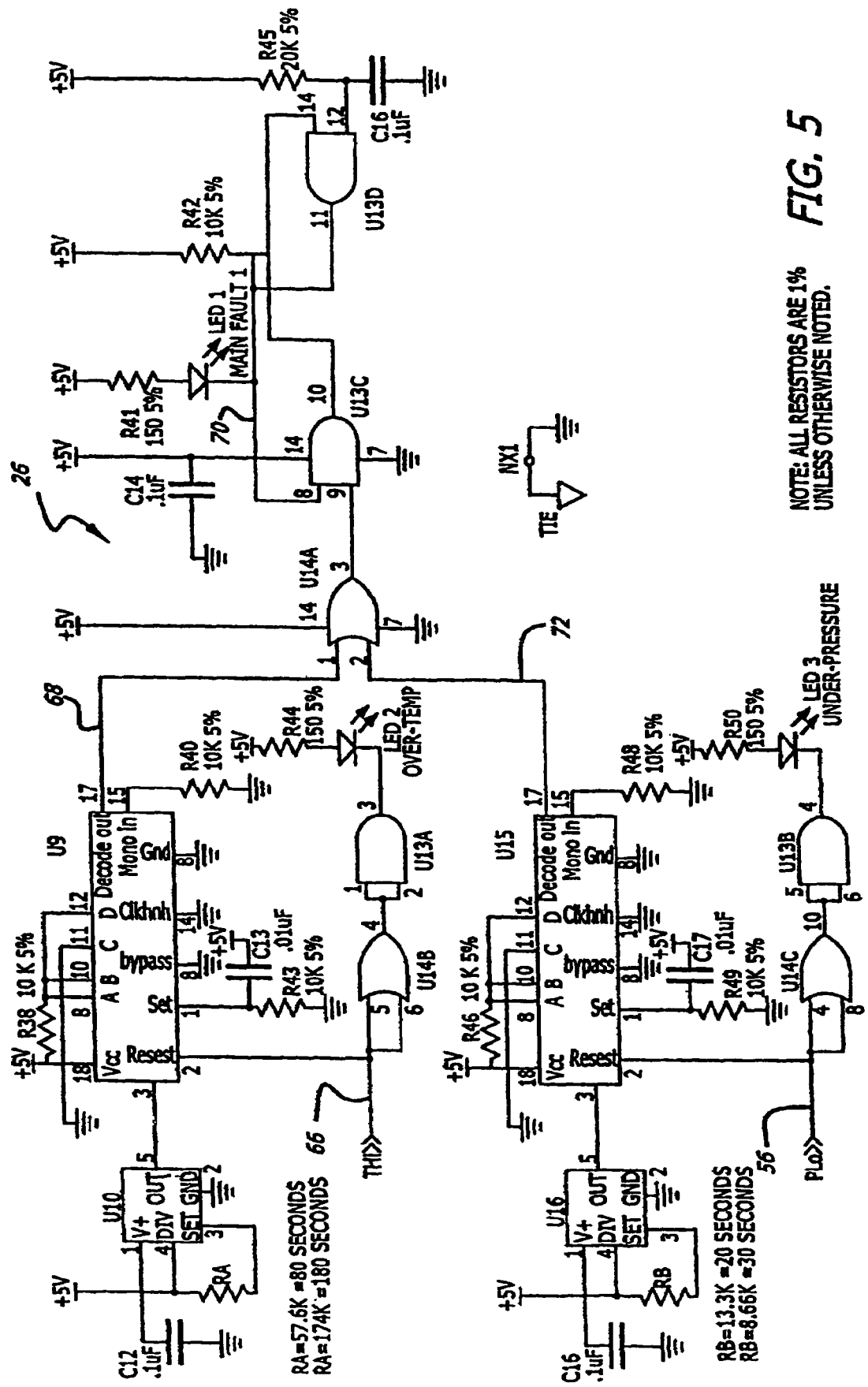
FIG. 5 is a detailed schematic diagram of one configuration of the logic and timing portion of the dry-run sensor of FIG. 2.

With reference to FIG. 5, in one configuration of the pump disconnect system, the timing and logic PAL 26 includes two independent precision programmable clocks U10, U16. The clocks are set by an adjustable resistor RA, RB or by programmable firmware. One clock U10 is programmed with the maximum amount of time an over-temperature signal 66 may be output by the temperature-sensing subsystem 22 before a main fault condition is determined to exist. In one embodiment of the system, the time ranges from 60 seconds (RA=57.6 k) to 180 seconds (RA=174 k). The other clock U16 is programmed with the maximum amount of time an under-pressure signal 56 may be output by the pressure-sensing subsystem 24 before a main fault condition is determined to exist. In one embodiment of the system, the time ranges from 20 seconds (RB=13.3 k) to 30 seconds (RB=6.66 k).

During an over-temperature condition, the over-temperature signal 66 is input to the reset pin of a first CMOS counter U9 and the counter begins to count the time in accordance with the clock U10. The counter U9 continues to count as long as an over-temperature signal 66 is present. If the counter U9 counts to the time prescribed by the clock, e.g., 60 seconds, then an over-temperature main fault signal 68 is output by the counter U9 and latched to an RS flip-flop U13, through NOR gate U14 as a main fault signal 70. Once latched by the over-temperature main-fault signal, the RS flip-flop U13 remains latched until the pump disconnect system is reset by being powered off and on.

The main fault signal 70 output by the RS flip-flop U13 is transmitted to the power controller 18 (FIG. 1) by the opto-coupled SCR 28. If the over-temperature condition ceases to exist within the fuel pump 12 prior to the termination of the prescribed time, the over-temperature signal 66 is no longer input to the counter U9 and the counter is reset to zero. In this case an over-temperature main fault signal is not output by the counter U9.

During an under-pressure condition, the under-pressure signal 56 is input to the reset pin of a second CMOS counter U15 and the counter begins to count the time in accordance with the clock U16. The counter U15 continues to count as long as an under-pressure signal 56 is present. If the counter U15 counts to the time prescribed by the clock, e.g., 20 seconds, then an under-pressure main-fault signal 72 is output by the counter U15 and latched to the RS flip-flop U13, through NOR gate U14 as a main-fault signal 70. Once latched by the under-pressure main-fault signal 72, the RS flip-flop U13 remains latched until the pump disconnect system is reset by being powered off and on.

The main fault signal 70 is transmitted to the power controller 18 (FIG. 1) by the opto-coupled SCR 28. If the under-pressure condition ceases to exist within the fuel pump 12 prior to the termination of the prescribed time, the under-pressure fault signal 56 is no longer input to the counter U15 and the counter is reset to zero. In this case an under-pressure main-fault signal 72 is not output by the counter U15.

With reference to FIG. 1, the output, i.e., main-fault signal 70, of the dry-run sensor 16 is provided to the power controller 18, which in one embodiment is an electrical relay. Upon receipt of the main-fault signal 70, the relay disengages the electrical power from the fuel pump 12. The power remains disengages until the main-fault signal 70 is not longer provided to the relay, which as previously mentioned, occurs upon reset of the pump disconnect system 14.

Figure 6:
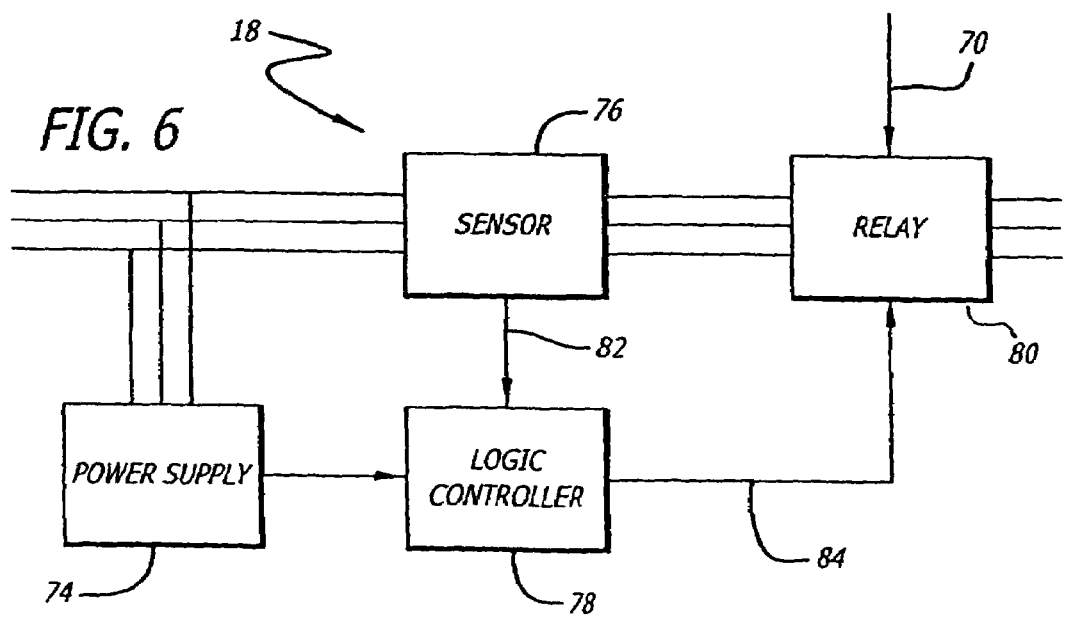
FIG. 6 is a detailed block diagram of one configuration of the power controller of FIG. 1.

In another currently preferred embodiment, the power controller 18 may include a sensor system configured to disengage power from the fuel system when a current imbalance is sensed in the electrical power current path providing electrical power to the fuel system. With reference to FIG. 6, a power controller 18 configured as such includes a power supply 74, a sensor 76, a logic controller 78 and a relay 80. In one configuration the sensor 76 is a Amploc Pro 5 Hall effect linear current sensor. The power supply 74 provides power to the logic controller 78. The sensor 76 monitors the current among the three, three phase electrical lines and outputs a sensor signal 82 to the logic controller 78 indicative of the current balance among the lines. The logic controller 78 receives the sensor signal 82, compares it to an established criteria and outputs a relay control signal 84 to the relay 80 if the sensor signal does not satisfy the criteria. Upon receipt of the relay control signal 84, the relay 80 removes power from the fuel pump 12.

Details of the current balance operation of the power controller and its configuration are disclosed in U.S. Pat. No. 6,618,229, which is assigned to the assignee of the present invention and the disclosure of which is hereby incorporated by reference. In addition to receiving the relay control signal 84, the relay 80 also receives the main fault signal 70 from the dry-run sensor 16. Accordingly, the power controller 18 is adapted to remove power from the fuel pump 12 in either of three operating conditions, an under-pressure condition, an over-temperature condition or a current imbalance condition.

With reference to FIG. 1, as previously mentioned, the pump disconnect system 14 also includes a run-time meter 20. Through its interface with the fuel pump 12, the run-time meter 20 senses when the fuel pump stops operation and records the time and duration of such stops.

Figure 7:
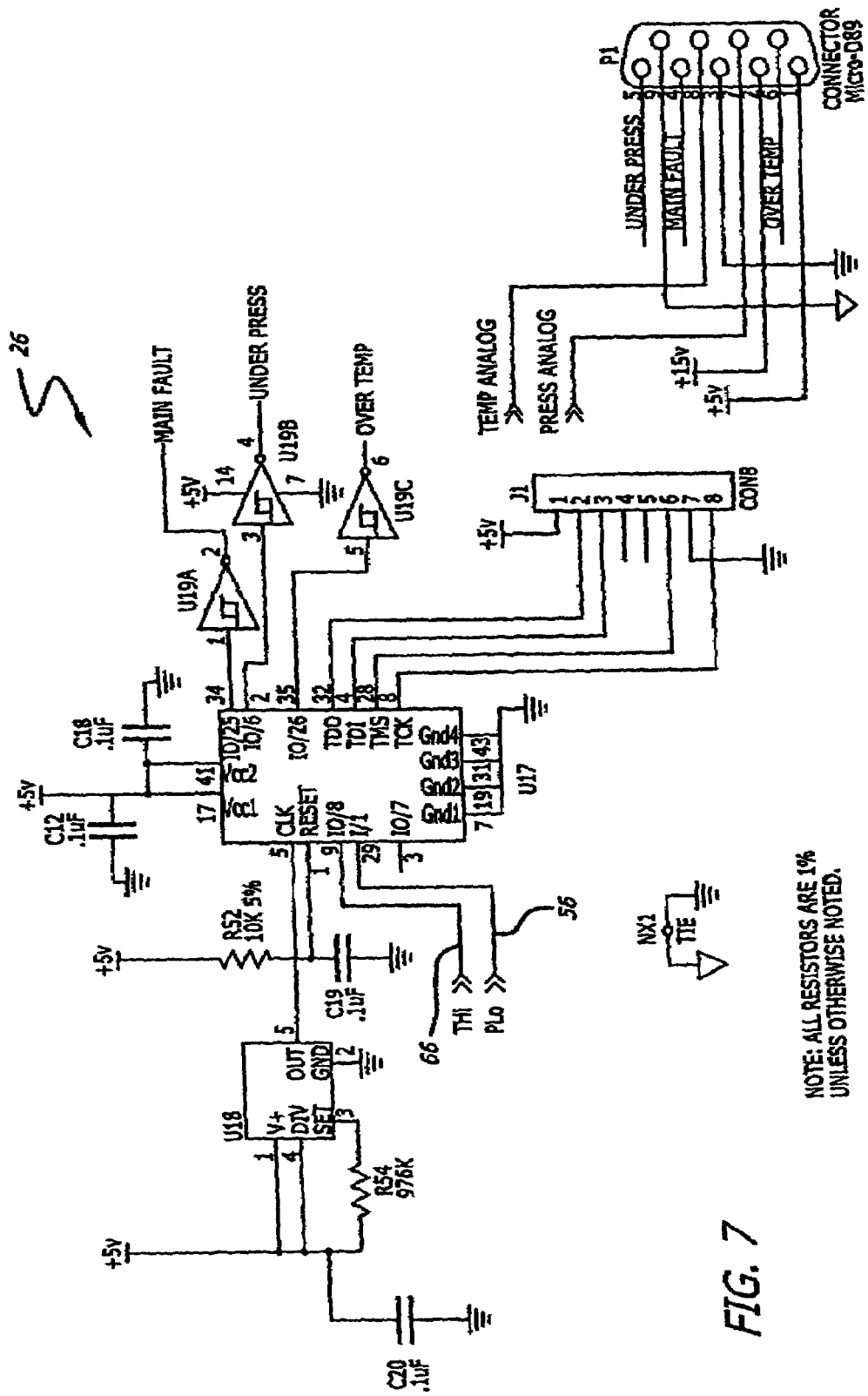
FIG. 7 is a detailed schematic diagram of an alternate configuration of the logic and timing portion of the dry-run sensor of FIG. 2.

With reference to FIG. 7, in another configuration of the system of the invention, the timing and logic PAL 26 includes a 64 pin Lattice device U17. Fault signals output by either of the pressure-sensing subsystem 24 or the temperature-sensing subsystem 30 are sent to the Lattice device U17 along with a 1.5 percent accurate clock generated by clock U18 and a reset signal for processing to a singular fault output.

The Lattice device U17 consists of four inputs and three outputs. The four inputs are as follows: Temperature on pin 9, Pressure on pin 29, Reset on pin 1, and Clock on pin 5. The clock input is fed into a counter that creates a 1 Hz clock internal to the PAL. This internal 1 Hz clock is used on two internal counters. The first is an 8-bit counter that initiates when the Temperature input is at a Low state, i.e., an over-temperature condition, and the Reset input is at a High state. If the Temperature input remains Low for 180 counts, or 180 seconds, the Tfault and Gfault on pins 34 and 35 respectively, switch to a High state. If the Temperature input switches to a High state at any time during the 180 second period, the counter resets to 0 counts and remains there. Similarly, the second counter is a 5-bit counter that initiates when the Pressure input is in a Low state, i.e., an under-pressure condition, and the Reset input is at a High state. If the Pressure input remains Low for 20 counts, or 20 seconds, the Pfault and Gfault on pins 2 and 35 respectively, switch to a High state. If the Pressure input switches to a High state at any time during the 20 second period, the counter resets to 0 counts and remains there.

With reference to FIG. 8, the dry-run sensor is located within a cylindrical housing portion 46 of the fuel pump 12 and is positioned such that the temperature transducer 30 and the pressure transducer 38 lie within or are positioned adjacent an ancillary fuel reservoir 86. In operation, fuel enters the fuel pump 12 through the inlet 88 through rotation of an impeller 90. The impeller 90 is rotated by a motor 92. Fuel then exits the fuel pump 12 through the outlet 94. A portion of the fuel enters the ancillary fuel reservoir 86 wherein the pressure and temperature conditions of it are monitored by the pressure transducer 38 and temperature transducer 30.

If the measured pressure is less than the threshold minimum for a prescribed time duration, the dry-run sensor 16 outputs an under-pressure signal and power is removed from the fuel pump by the power controller 18. Likewise, if the measured temperature is greater than the threshold maximum for a prescribed time duration, the dry-run sensor 16 outputs an over-temperature signal and power is removed from the fuel pump 12. At the same time, the run-time meter 20 begins to record the duration of time that the pump is off.

Referring to FIGS. 3, 4 and 7, the following devices are shown. All resistors are 1% unless otherwise noted.

| Reference Designation | Part Number | Manufacture |
|---|---|---|
| C1-C12, C18-C20 | 12062R103K9B20D | Various |
| D1-D3 | | Various |
| J1 | | Various |
| PT1 | 150SP | Precision Measurement Co. |
| TT1 | PT 100/8A*G | Sensing Devices Inc. |
| R1, R5 | ERA-3YEB203V | Panasonic |
| R2 | ER-J-3EKF3321V | Panasonic |

-continued

| Reference Designation | Part Number | Manufacture |
|---|---|---|
| R3 | ERJ-3EKF6651V | Panasonic |
| R4, R12, R15, R24, R26, R33, R52 | ERJ-3EKF1002V | Panasonic |
| R10, R28 | ERJ-3EKF2002V | Panasonic |
| R11, R27 | ERJ-3EKF-1004V | Panasonic |
| R13, R14, R30, R31 | ERJ-3EKF3242V | Panasonic |
| R16, R17, R34, R36 | ERA-6YEB104V | Panasonic |
| R18, R21 | ERA-3YEB103V | Panasonic |
| R19, R20 | ERJ-3EKF2002V | Panasonic |
| R22, R23 | ERJ-14NF1300U | Panasonic |
| R25 | S0505CA4992BHB | State of the Art |
| R29 | S0505CA2551BHB | State of the Art |
| R32 | ERJ-3EKF4991V | Panasonic |
| R35 | S0505CA5621BHB | State of the Art |
| R51, R53, R55 | | Various |
| R54 | ERJ-3EKF9673V | Panasonic |
| U1, U5 | LM2904M | National Semiconductor |
| U2, U6 | LTC1798CS8-2.5 | Linear Technology |
| U3, U7 | LMC2001AIM | National Semiconductor |
| U4 | TLC372MD | Texas Instruments |
| U17 | M4A5-64/32-10VC48 | Lattice |
| U18 | LTC1799IS5 | Linear Technology |
| U19 | CD4011BM | Texas Instruments |

From the above, it may be seen that the present invention provides for an automated method and apparatus to monitor pump conditions for fuel pumps of the type used on complex aircraft and to automatically remove power from a pump that is operating under conditions which could damage the pump. More particularly, the present invention provides a system which can be implemented in existing pumps or pumps of new design with relatively little impact on the remainder of the pump or its drive system, and can be configured to be either fully contained in the pump system or with some of the components of the invention located remotely from the pump for convenience in access and monitoring.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A system for controlling the application of electrical power to a fuel pump in response to an operating condition within the fuel pump, said system comprising:
   means for measuring a fuel pressure within the fuel pump;
   means for comparing the fuel pressure to a predetermined threshold fuel pressure of 20 PSI; and
   means for disengaging the electrical power from the fuel pump when the fuel pressure is at or below the threshold fuel pressure indicating a dry-run condition for a prescribed time duration of approximately 20 to 30 seconds.

2. The system of claim 1 wherein said means for measuring the fuel pressure within the fuel pump comprises means for positioning a pressure transducer such that the pressure transducer may detect the fuel pressure within the fuel pump.

3. The system of claim 1 further comprising means for positioning a temperature transducer relative to the fuel pump such that the temperature transducer may detect the temperature within the fuel pump.

4. A system of controlling the application of electrical power to a fuel pump in response to an operating condition within the fuel pump, said system comprising:
   means for measuring a temperature within the fuel pump;
   means for comparing the temperature within the fuel pump to a predetermined threshold temperature;
   means for disengaging the electrical power from the fuel pump when the temperature within the fuel pump is at or above the threshold temperature indicating a dry-run condition for a prescribed time duration; and
   wherein the threshold temperature is 190° F. and the prescribed time duration is from approximately 60 to 180 seconds.

5. The system of claim 4 wherein said means for measuring the temperature within the fuel pump comprises means for positioning a temperature transducer relative to the fuel pump such that the temperature transducer may detect the temperature within the fuel pump.

6. The system of claim 4 further comprising means for positioning a pressure transducer such that the pressure transducer may detect the fuel pressure within the fuel pump.

* * * * *